June 12, 1934.  J. E. MITCHELL  1,962,320
COTTON DRYING APPARATUS
Filed June 23, 1932
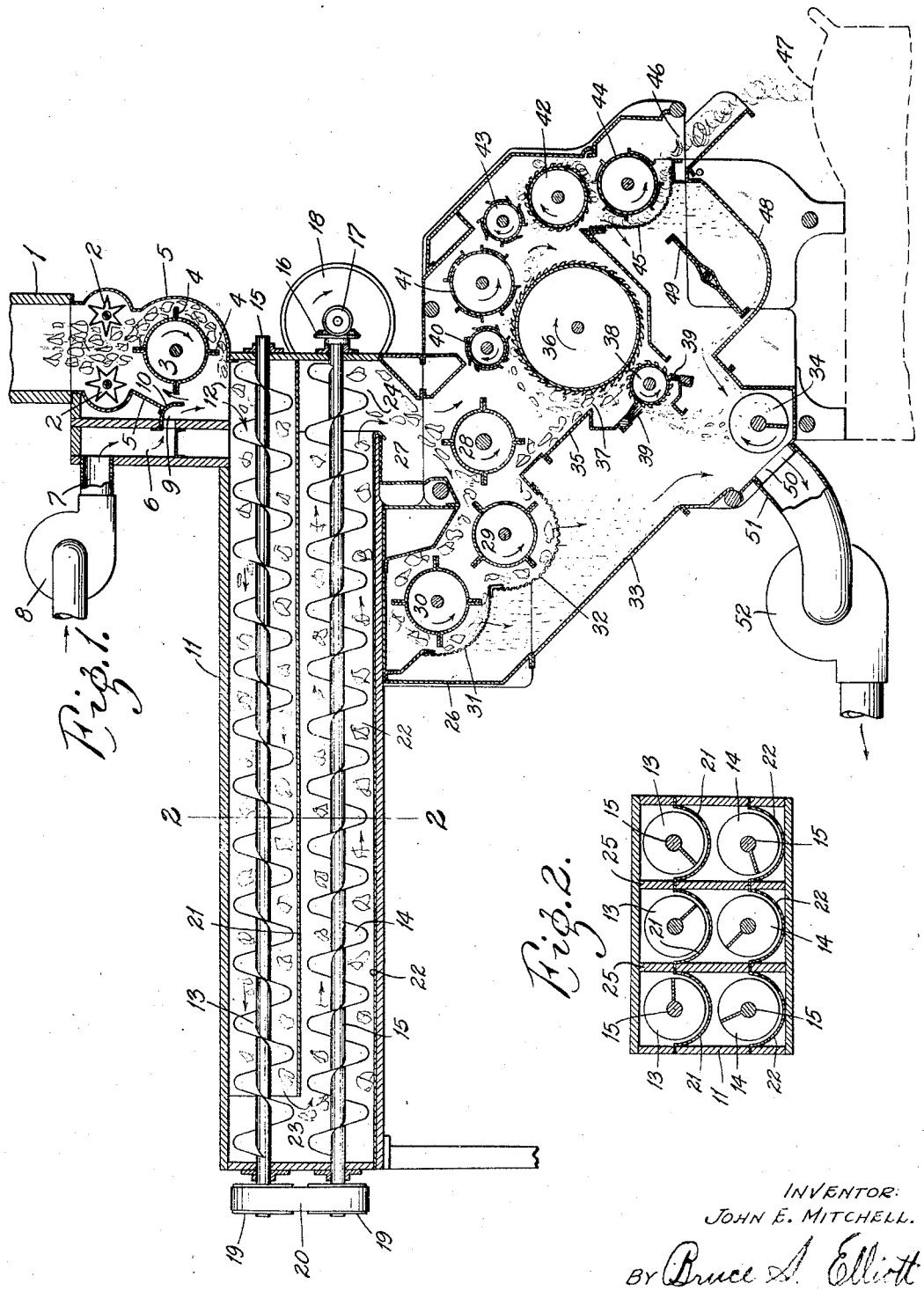
INVENTOR:
JOHN E. MITCHELL.
BY Bruce A. Elliott
ATTORNEY.

UNITED STATES PATENT OFFICE 1,962,320

COTTON DRYING APPARATUS

John E. Mitchell, Dallas, Tex.

Application June 23, 1932, Serial No. 618,876

2 Claims. (Cl. 19—74)

This invention relates to novel apparatus for use in drying cotton, and has for its general object to provide a simple and compact arrangement of mechanism for insuring intimate exposure of individual locks of fluffed cotton to currents of heated air for a sufficient length of time to insure the removal of excess moisture from the cotton while it is being withdrawn from hoppers located beneath, and supplied with cotton from, a distributor and fed to and passed through cotton cleaning and extracting machinery.

Other objects of the invention are to provide means for fluffing the individual locks of cotton in the regulated stream of cotton discharged from the hoppers by feeding rollers; to provide effective means, occupying a minimum height in space, for agitating the cotton while it is being exposed to the current of heated air, and to retard the flow of cotton on its way to the cleaning and extracting mechanism, whereby to expose it long enough to the heated air to permit the excess moisture to be taken up by the air before the cotton reaches the cleaning and extracting mechanism, and to provide for a portion of the heated air to filter up through the mass of cotton contained in the hoppers for the purpose of increasing the length of time the cotton is exposed to the heated air as it leaves the distributor and before it is discharged from the cleaning and extracting machinery to the gin stand below.

As in the case of the apparatus illustrated in my pending application, Serial No. 608,633, filed May 2, 1932, the moist air is drawn out from the system at the bottom of the cotton extracting and cleaning machine, but this feature of itself, enters into the present case only as it is combined with the other features of my novel apparatus.

A distinctive feature of my present invention is the fact that the cotton is caused to take an indirect course from the point where it is fed into the machine to the point where it is discharged into the cleaning and extracting mechanism, and specifically to be passed in opposite directions in paths at right angles to the axes of the feeding rollers and fluffing cylinder and of the rotary members embodied in the cleaning and and extracting mechanism, and during such movement it is agitated, retarded in its flow, and subjected to a relatively prolonged contact with a current of heated air, whereby it is substantially entirely dried before it is discharged into that portion of the apparatus where the cleaning and extracting occurs.

In the accompanying drawing,

Figure 1 is a vertical cross-sectional view through an apparatus involving my invention; and Figure 2 is a vertical cross-sectional view through the housing of the agitating conveyors, taken on the line 2—2 of Figure 1.

Referring now to the drawing, the numeral 1 indicates a hopper leading from the bottom of a conventional distributor, (not shown), below which two feed rollers, 2, are mounted which rotate toward each other and operate to withdraw regulated quantities of cotton from the hopper. Below the feeding rollers is mounted a fluffing cylinder, 3, which is provided with a number of longitudinal blades, 4, about its periphery, which extend from end to end of the cylinder. The fluffing cylinder 3 rotates at a high rate of speed, and the blades thereof engaging the locks of cotton delivered by the feeding rollers operate by impact to loosen or fluff the said locks of cotton, thereby putting them in condition where the heated air may more readily penetrate the cotton and reach the individual fibers thereof to absorb the moisture therefrom. The feeding rollers and the fluffing cylinder are enclosed on one side, and in part on the other, by a casing section, 5, suitably shaped to lie in substantially close proximity to these members. To the left of the feed rollers and fluffing cylinder, as shown in Figure 1, I provide a vertically-disposed hot air receiving, or expansion chamber, 6, which is entered at its upper end at one side by a pipe, 7, leading from a hot air furnace, or other source of heated air (not shown) and having in its length a pressure fan, 8, for forcing the heated air into the chamber 6. At its lower end, on the opposite side from that entered by pipe 7, the expansion chamber 6 is provided with a restricted outlet, 9, having disposed slightly beyond it a curved guard, 10, which operates to direct the heated air emerging from outlet 9 in a downward direction. The casing section 5 and the expansion chamber 6 are mounted on one end of a relatively long, horizontal housing, 11. The upper side of the housing 11 supports the casing section 5 and the expansion chamber 6, and is provided with an opening, 12, through which heated air forced through the restricted outlet 9 from the expansion chamber passes into the housing. The cotton delivered from the casing section 5 by the fluffing cylinder 3 is also discharged through the opening 12 into the end of the housing 11, and it is a feature of the invention that this cotton is caused to travel in one direction to the remote end of housing 11 and then in the opposite direction to the end of the housing from which it started, before being delivered to the cleaning and extracting mechanism, and during this indirect passage of the cotton to the cleaning and extracting machine the normal movement thereof, which would be caused by the heated air current, is retarded, and the cotton is thoroughly agitated and, in the embodiment of the invention shown, is subdivided into a plurality of streams to facilitate intimate contact therewith by the heated air.

To this end, I mount in the housing 11 two parallel series of combined conveyors and agitators, an upper series of conveyors, 13, and a lower series of similar conveyors, 14, the shafts, 15, of the various conveyors being rotatably mounted in suitable bearings in the end walls of housing 11. One of the lower shafts 15 is provided at one end with a bevel gear, 16, meshing with a bevel gear, 17, on a driving member, 18, and the shafts 15 at the opposite ends have pulleys, 19, provided with suitable belts, 20, so that all of the agitating conveyors will be appropriately driven, and in the proper direction. Located under each of the conveyors 13 is a semi-cylindrical casing member, 21, and located under each of the conveyors 14 is a similar semi-cylindrical casing member, 22. The casing members 21 extend from the feed end of the housing 11 toward the opposite, or remote, end of the housing, but terminate short of said latter end in order to provide a space, 23, through which the cotton may pass from the upper series of agitating conveyors to the lower series. On the other hand, the casing members 22 extend from the remote end of housing 11 to the feed end, but terminate short of the latter end, so as to provide an opening, 24, through which the cotton may be discharged into the cleaning and extracting mechanism below. Between each pair of conveyors 13, 14, and an adjacent pair, I provide vertical partitions, 25, on which corresponding ends of the casing members 21 and 22 are mounted, as shown in Figure 2, and as the partitions 25 extend throughout the length of the conveyors from opposite ends of the housing 11, they serve, with the casing members 21 and 22 and the top and side walls of the housing 11, to enclose each conveyor, so that each conveyor causes the cotton to follow a closed path from one end of the housing 11 to the opposite end, and while passing through these enclosures the cotton is brought into intimate contact with the heated air forced out through the opening 12 and caused to circulate through the separate compartments housing the two series of conveyors.

The cleaning and extracting part of the apparatus comprises a casing, 26, on which the housing 21 is in part supported, which casing is provided on its upper side with an opening, 27, which communicates with the opening 24 at the outlet end of the housing 11. Located under the opening 27 is a distributing cylinder, 28, which operates to throw the cotton falling through said opening onto the lowermost of two bladed beating cylinders, 29, 30, the cotton being transferred from the cylinder 29 to the cylinder 30 and then in the reverse direction from the underside of cylinder 30 to the underside of cylinder 29, in this latter passage passing over screens, 31 and 32, through which screens dirt and small trash escape and slide down an inclined wall, 33, of the casing to a conveyor, 34. The cotton is then thrown from the underside of cylinder 29 to the underside of distributing cylinder 28 whence it passes down a hull board, 35, to be engaged by the teeth of a saw cylinder, 36, hulls and trash escaping through an opening, 37, provided between the lower end of the hull board and the saw cylinder. The numeral 38 indicates a small reclaiming saw cylinder which operates in conjunction with brushes, 39, to discharge the hulls to the conveyor 34 and return small locks of cotton passing through the opening 37 to the saw cylinder 36. The numeral 40 indicates the usual kicker roll for knocking back hulls and trash from the cotton carried up by the saw cylinder, and the numeral 41 a doffer for removing cotton from saw cylinder 36 and discharging it onto a smaller saw cylinder, 42, with which cooperate a kicker roll, 43, on the upper side and a doffer, 44, on the lower side. The doffer 44 is partly surrounded by a screen, 45, and passes the cotton over said screen to remove dirt and small trash therefrom, after which the cotton is discharged by the doffers through an opening, 46, into the breast of the gin stand, 47, on the top of which latter the cleaning and extracting machine is mounted.

The dirt and trash passing through screen 45 falls into a curved trough, 48, formed in the bottom of the casing, and is continuously removed by a wiper, 49, and delivered to the conveyor 34.

At one end of the conveyor 34 there is provided in the bottom of the cleaning and extracting machine an outlet opening, 50, to which is connected a pipe, 51, leading to a suction fan, 52, which operates to draw moist air and trash through said opening and deliver it to the outer air.

In operation, the power of suction of fan 52 combined with the propelling force of fan 8 is sufficient to create a powerful draft or current of hot air through the housing 11 the screens 31, 32 and 45 and the outlet 51, so that the cotton in all parts of the apparatus will be subjected to contact with the hot air while it is being treated by the various parts of the apparatus described. The cotton delivered by the fluffing cylinder 3 to the opening 12 of the agitator housing 11 passes immediately under the restricted outlet 9, which operates to distribute the heated air throughout the entire length of the casing enclosing the fluffing cylinder and throughout the entire width of the series of agitating conveyors 13. It will be observed, however, and as indicated by the arrows, that a space is provided between the mouth of the restricted outlet 9 and the fluffing cylinder, so that, as there will be a certain amount of resistance to the passage of heated air through the housing 11, due to the fact that the cotton and conveyors 13 and 14 greatly restrict the area within the housing 11 for the free passage of the hot air through the separate compartments enclosing said agitators, a certain amount of back pressure will be created within the casing section 5, causing some of the heated air to pass upward between the feeding rollers 2 and to filter through the cotton in the hopper 1. However, the thick body of cotton contained in the hopper offers considerable resistance to the heated air passing through the cotton so that, due to the suction produced by fan 52, as previously explained, most of the heated air will be caused to move with, or to follow, the separate streams of cotton through the upper series of parallel conveying agitators 13 and back through the lower series 14, as indicated by the arrows.

When the apparatus is not used for the purpose of drying cotton; or, when there is no current of heated air passing through with the streams of cotton, the parallel series of conveyors will mechanically convey or force the cotton along through the separate compartments housing the conveyors. When the current of heated air is turned on, however, for drying wet or damp cotton, a considerable volume of heated air is used, which is caused to move at considerable velocity, and by reason of the restricted area around each conveyor, the velocity of the heated air current is sufficient to force the cotton along faster than the conveyors would mechanically propel it, so that the conveyors, which also act as agitating members, serve to retard the movement of the cotton, while the current of heated air is being forced through the compartments housing the conveyors to absorb the excess moisture.

The preheating of the cotton by a portion of the heated air which filters through the body of cotton while it is confined within the hopper above the feeding rollers, plus the intimate contact of the heated air with the fluffed locks of cotton while they are being agitated and retarded in movement by the two series of parallel conveyors, affords ample opportunity for the heated air to absorb the excess moisture from the cotton before it reaches the extracting and cleaning machinery, which fact greatly increases the effectiveness of this mechanism in removing both fine and coarse trash from the cotton.

While I have illustrated and described one embodiment of my invention, I wish it understood that the same is not limited to the precise arrangement and construction of parts shown. For example, the invention is not limited to the type of agitating and conveying mechanism illustrated, as other means could be employed for the purpose, as indicated in the claims; and even when the construction illustrated is employed, it is not an essential of the invention that the agitating series of conveyors 13 and 14 should be horizontally disposed, although, as stated, I prefer this arrangement.

It should be stated, also, that, if desired, the cotton could be subjected to a fluffing action in the distributor before being delivered to the hopper 1, in the manner described, illustrated and claimed in my pending application, Serial No. 605,561. However, I have not included this feature in the present case as it does not form an essential part of this invention.

Finally, while I have described and illustrated my invention in connection with a single machine supplied by a single hopper, and while it can be so operated, in actual practice there will ordinarily be a line of gin stands, on each one of which a cleaning and extracting machine will be mounted, and the drying operation I have described with reference to a single machine, would simultaneously take place in all of the machines, which would be supplied with cotton by a distributor through a series of hoppers 1, in the well known way.

I claim:

1. Apparatus for drying cotton comprising, in combination, cotton feeding rollers, a casing enclosing the same, a cotton cleaning and extracting machine, combined conveying and agitating means interposed between the feeding rollers and said machine and adapted to cause an indirect passage of the cotton from the feeding rollers to said machine, and means for bringing a current of heated air into engagement with the cotton in the area between the feeding rollers and the point of engagement of the cotton by said conveying and agitating means.

2. Apparatus for drying cotton comprising, in combination, a casing, a pair of feed rollers mounted therein, a hopper for delivering cotton to said feeding rollers, cotton fluffing means located below said feed rollers, means for forcing a current of heated air into said casing in the area of the cotton delivered by said fluffing means, a housing having at one end an opening for receiving the fluffed cotton and an opening for delivering the same, two parallel series of conveyors mounted in said housing with their axes extending at right angles to the axes of said feed and fluffing members, each of said conveyors being separately enclosed, the upper series being adapted to cause the passage of the fluffed cotton to the remote end of said housing and deliver the same to the second series, and the latter being adapted to cause the passage of the cotton in the opposite direction through said housing to the delivery opening, a cotton cleaning and extracting machine positioned to receive the cotton delivered through said opening, and suction means operating from the bottom of said cleaning and extracting machine and causing the heated air to be drawn through the separate enclosures of said conveyors over the course followed by the cotton and through and out of the cleaning and extracting machine.

JOHN E. MITCHELL.